United States Patent [19]

Rodrigues

[11] Patent Number: 5,478,052
[45] Date of Patent: Dec. 26, 1995

[54] CARRIAGE FOR GUIDING A TOOL ALONG A SPECIFIED PATH ON A WORKPIECE

[75] Inventor: Anil N. Rodrigues, Pittsburgh, Pa.

[73] Assignee: Weld Tooling Corporation, Pittsburgh, Pa.

[21] Appl. No.: 226,293

[22] Filed: Apr. 11, 1994

[51] Int. Cl.$^6$ .................................................. B23K 7/10
[52] U.S. Cl. ............................. 266/68; 266/71; 266/67
[58] Field of Search .............................. 266/48, 67, 68, 266/69, 71

[56] References Cited

U.S. PATENT DOCUMENTS

| | | | |
|---|---|---|---|
| 2,018,259 | 10/1935 | Hartley | 266/69 |
| 2,187,731 | 1/1940 | Davis | 266/71 |
| 2,270,242 | 1/1942 | Anderson | 266/67 |
| 2,452,189 | 10/1948 | Helmkamp | 266/23 |
| 3,072,779 | 1/1963 | Masters et al. | 219/125 |
| 3,201,561 | 8/1965 | Damon | 219/125 |
| 3,325,625 | 6/1967 | Ogden | 219/125 |
| 3,779,444 | 12/1973 | Kensure | 266/68 |
| 3,870,853 | 3/1975 | Reinhardt et al. | 219/125 |
| 3,880,340 | 4/1975 | Takeuchi et al. | 228/45 |
| 3,937,918 | 2/1976 | Robertson | 219/125 |
| 4,101,755 | 7/1978 | Uratani | 219/124.31 |
| 4,392,604 | 7/1983 | Sears | 228/212 |

Primary Examiner—Scott Kastler
Attorney, Agent, or Firm—Webb Ziesenheim Bruening et al.

[57] ABSTRACT

A carriage is disclosed for holding and guiding a tool along a specified path on a workpiece at a controlled, substantially constant speed. The carriage has at least one drive roller disposed on a bed with drive means for rotating the drive roller. A pair of idler rollers are attached to the bed in opposed relation to the drive roller. A pair of transverse rollers are mounted on the bed and are adapted to ride along an upper edge of a flange disposed on the workpiece.

14 Claims, 6 Drawing Sheets

CARRIAGE FOR GUIDING A TOOL ALONG A SPECIFIED PATH ON A WORKPIECE

BACKGROUND OF THE INVENTION

1. Field of the Invention

This invention relates to a carriage for guiding a tool along a specified path on a workpiece and, more particularly, relates to guiding a tool along a flange on a workpiece at a controlled, substantially constant speed.

2. Description of the Prior Art

In welding operations, the majority of jobs which require moving a tool along a specified path on a workpiece at a controlled speed are still mainly done manually with stick electrodes. However, an increasing number of such jobs are being automated. Machines that perform such automation usually include a tool attached to a drive car that travels on a track adjacent to the workpiece. This track has to be aligned and attached to either the workpiece or an adjacent fixture, taking up valuable production time.

Further, if the job requires cutting or welding along a path other than a straight line, such as along curves of varying radii, the track has to be made to conform to the contour of the workpiece. Forming such a track may be impractical, if not impossible. Furthermore, when the track is adjusted for use with a curved workpiece, the radius of curvature of the track may be different from the radius of curvature of the work path by an offset amount. This means that the drive speed of the tool guiding apparatus must change on the curved path as compared to the straight path to compensate for this difference and keep the speed of the tool substantially constant.

In the devices that use a guiding track conforming to the shape of the workpiece, the fabrication and setup of the guiding track must be precise, since any deviation will not be compensated for unless additional takeup mechanisms are provided. These takeup mechanisms, in turn, tend to make the apparatus unwieldy.

There are a few machines that do not use a track for guidance. These are mostly gravity-assisted friction devices that have lateral guide rollers to follow the work path, typically following a vertical flange member for a fillet weld joint. However, these devices are generally meant for straight line runs only and are large and heavy since they depend on gravity for stability.

Accordingly, it is an object of the present invention to overcome the deficiencies in the prior art with respect to guiding a tool along a specified path on a workpiece at a controlled, substantially constant speed.

SUMMARY OF THE INVENTION

Briefly, according to this invention, a carriage is designed for guiding a tool along a specified path on a workpiece at a controlled, substantially constant speed. The carriage comprises a bed, having a pair of skirt flanges, which is moveable along a workpiece flange extending from the workpiece. Preferably, the workpiece flange should extend vertically from a horizontal face of the workpiece. However, the flange may extend at any angle which allows placement of the carriage on the flange.

At least one drive roller is rotatably supported from the bed to be disposed on one side of the flange. The drive roller is supported from the bed to abut one face of the flange. A motor is attached to the bed to drive the rotation of the drive roller. In a preferred embodiment, two drive motors are attached to the bed and each drives the rotation of an associated drive roller.

A pair of idler rollers are rotatably supported from the bed to abut a second side of the flange. In a preferred embodiment, the pair of idler rollers are placed in opposed relation to the two drive rollers, that is, abutting the opposite face of the flange. The idler rollers are adjustable toward and away from the drive roller to vary the lateral distance between the idler rollers and drive roller to accommodate the thickness of the flange.

A pair of transverse rollers are rotatably attached to the bed in front of and behind the carriage and are designed to ride along an upper edge of the flange. The carriage is caused to tilt in the direction of movement which biases the carriage toward the workpiece as it moves along the flange. In a preferred embodiment, this biasing may be accomplished by positioning the forwardmost and rear transverse roller axes of rotation on opposite sides of a plane of the bed. Alternatively, the axes of rotation of the forwardmost and rear transverse rollers may lie in the same plane as the bed, in which case the diameter of the forwardmost transverse roller may be made less than that of the rear transverse roller, again causing the carriage to tilt in the direction of movement. A housing is placed on an upper part of the bed enclosing the drive motor. A tool, for example a welding or cutting torch, is attached to the housing via an adjustable holder.

DESCRIPTION OF THE PREFERRED EMBODIMENTS

FIGS. 1 to 4 illustrate a preferred embodiment of a carriage 10 according to this invention for guiding and holding a tool 50 along a path on a workpiece 54 at a substantially constant, controlled speed. The carriage 10 comprises a planar bed 16 with a pair of lateral skirt flanges 18 pendant therefrom.

Figures 1, 2, 3:
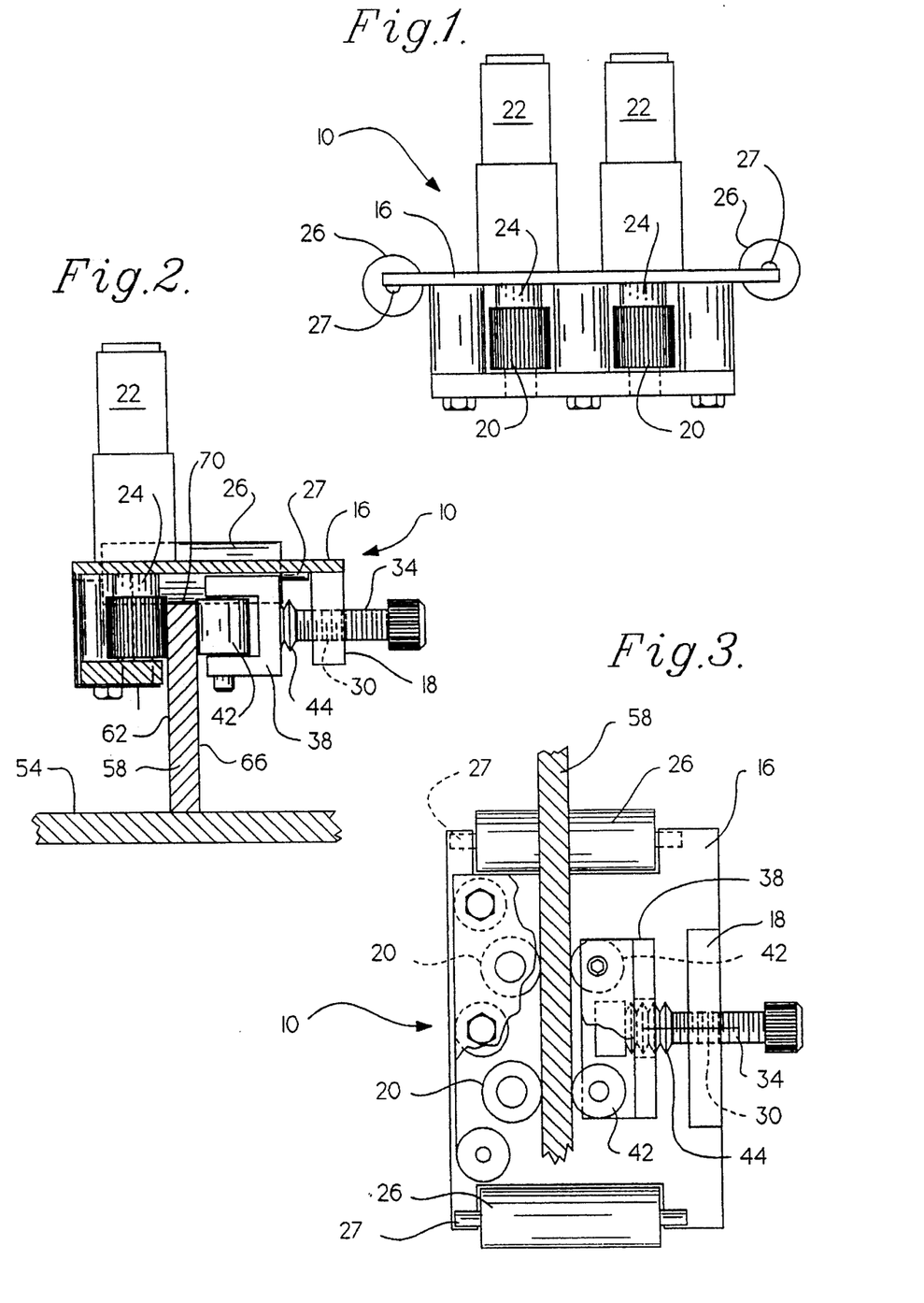
FIG. 1 is a side view of the bed according to a preferred embodiment showing placement of the drive motors and drive gear on the bed.
FIG. 2 is a front view of the bed according to a preferred embodiment showing the position of the drive rollers and idler rollers on the workpiece flange.
FIG. 3 is a bottom view of a preferred embodiment of the invention showing the position of the drive rollers, idler rollers and transverse rollers with respect to the workpiece flange.

In a preferred embodiment, as shown in FIG. 1, a pair of drive motors 22 are mounted on a top surface of the planar bed 16. Each drive motor 22 has a shaft 24 which passes through the planar bed 16 and connects to a rotatable drive roller 20. The drive rollers 20 are preferably made of hardened steel with a knurled surface for traction. However, for workpiece flanges 58 with rough surfaces, the steel drive rollers 20 can be fitted with cylindrical rubber sleeves which smooth out the travel of the carriage 10 while retaining adequate traction.

Figure 5:
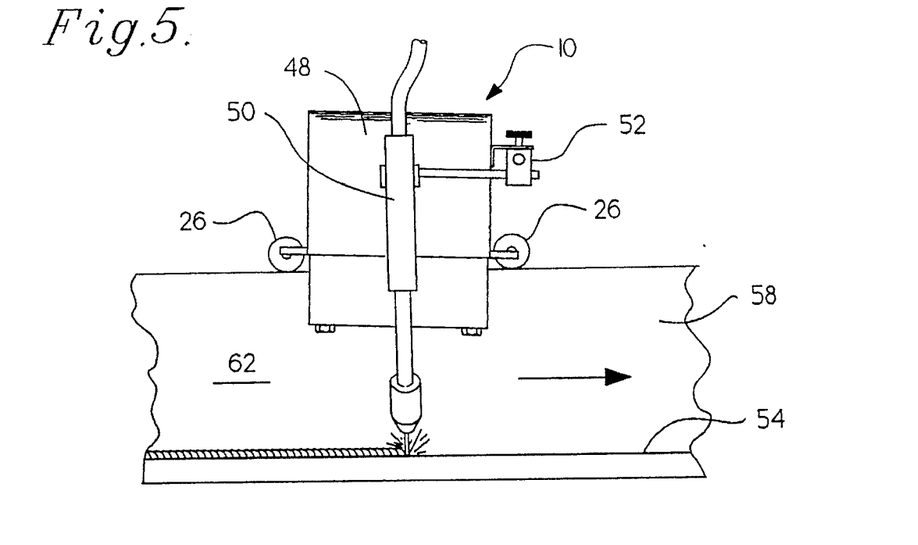
FIG. 5 is a side view of the carriage as it moves along the workpiece.

At each end of the bed 16 are detachably mounted, rotatable, transverse rollers 26. The transverse rollers 26 are mounted on axles 27 which can be attached to either a top surface or bottom surface of the bed 16. The forwardmost transverse roller 26, with respect to a direction of movement of the carriage 10, is secured to the top surface of the bed 16 and the rear transverse roller 26 is secured to the bottom surface of the bed 16, as shown in FIG. 5, causing the carriage 10 to pitch forward as it moves along the workpiece flange 58 thus biasing the carriage 10 to the workpiece flange 58. Thus, the pair of transverse rollers 26 are positioned on the bed 16 such that a forwardmost part of the bed 16 is closer to an upper edge 70 of the workpiece flange 58 than is a rearmost part of the bed 16. Alternatively, the axles 27 of the transverse rollers 26 may be positioned in a plane of the bed 16 with the forwardmost transverse roller 26 having a diameter less than that of the rear transverse roller, again causing the carriage 10 to pitch forward. Because this biasing of the carriage 10 against the workpiece flange 58 causes the carriage 10 to, in effect, cling to the workpiece flange 58, the carriage 10 can be used in any spacial orientation.

Figure 11:
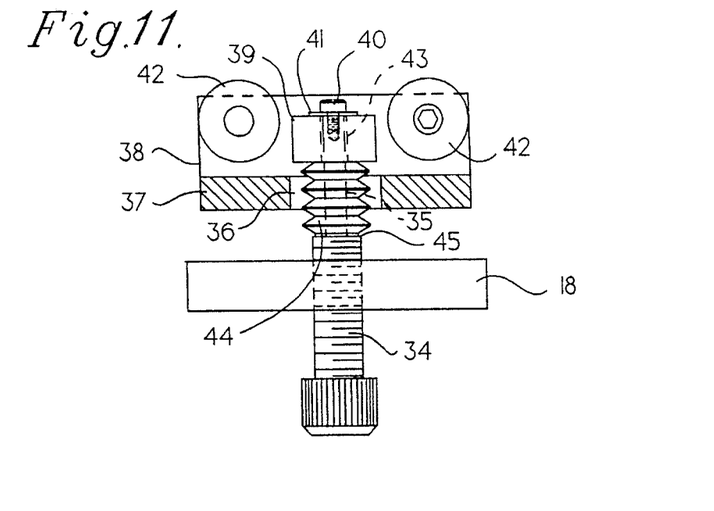
FIG. 11 is a top view of a roller block showing the connection between the adjusting screw and the roller block.

As shown in FIGS. 2 and 11, one of the lateral skirt flanges 18 has a threaded bore 30 through which passes an adjusting screw 34. A roller block 38, having a pair of idler rollers 42, is carried at the end of the adjusting screw 34 in the following manner. The adjusting screw 34 has an end segment 35 of a lesser diameter than that of the remainder of the screw 34. The screw 34 passes through a threaded bore 36 in a base 37 of the roller block 38. The end segment 35 of the screw 34 passes through a bore 43 in a stage 39 mounted in the roller block 38 between the idler rollers 42. A locking screw 40 and washer 41 are attached to a distal end of the end segment 35 to prevent the distal end of the end segment 35 being withdrawn through the bore 43 in the stage 39. A series of spring washers 44 surround the end segment 35. The spring washers 44 are contained between the stage 39 and an annular face 45 on the screw 34. The spring washers 44 bias the roller block 38, and thus the idler rollers 42, in a direction toward the drive rollers 20. The limited axial movement of the roller block 38 permitted by compression and expansion of the spring washers 44 accommodates variations in the thickness and curvature of the flange 58.

As shown in FIGS. 2 and 3, the roller block 38 carries a pair of spaced-apart, rotatable idler rollers 42. These idler rollers 42 are preferably positioned in opposed relation to the drive rollers 20. The roller block 38 has an upper, flat face that slides along the flat bottom of the bed 16. Thus, as the adjusting screw 34 is turned, the roller block 38 moves toward or away from the skirt flange 18 wherein the screw is threaded while rotation of the roller block 38 is prevented.

Figures 4, 6:
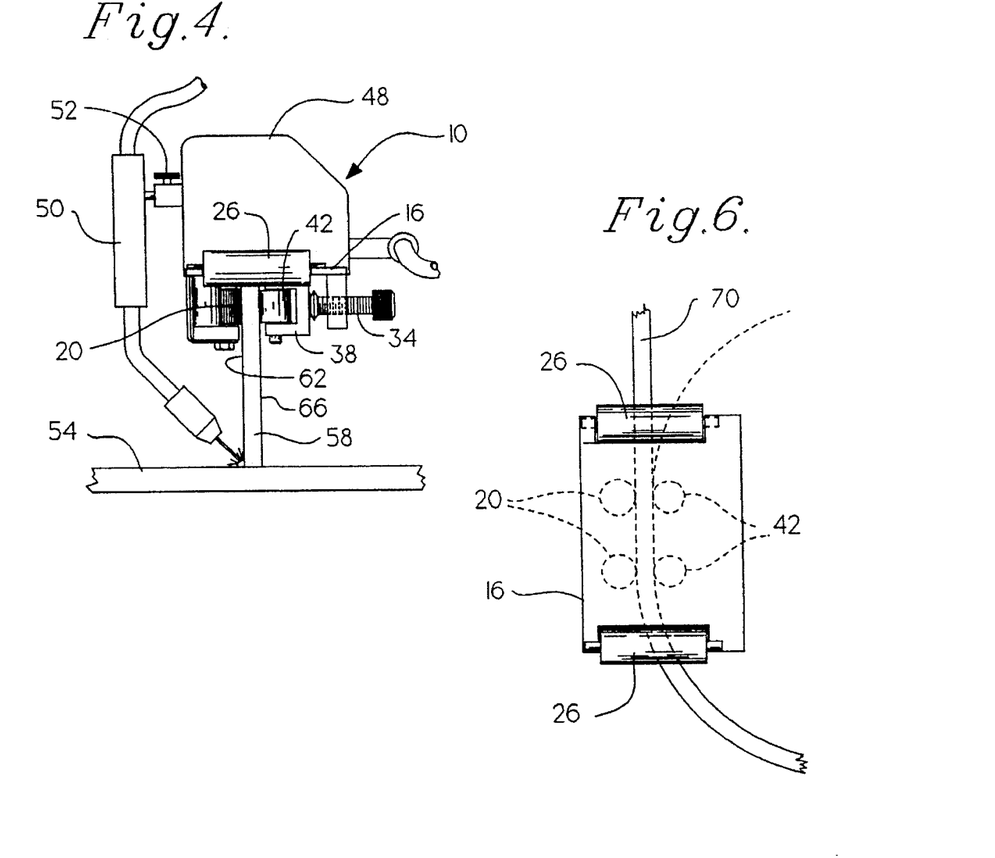
FIG. 4 is a front view of the carriage showing the position of the tool on the housing.
FIG. 6 is a top view of the carriage showing movement from a straight to a curved section of the workpiece.
Figure 9:
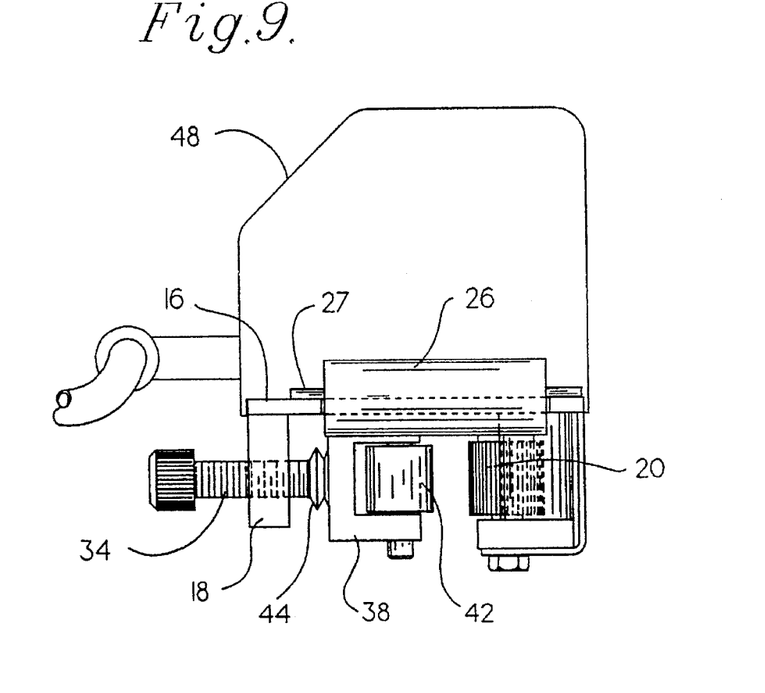
FIG. 9 is a front view of the carriage housing.
Figure 10:
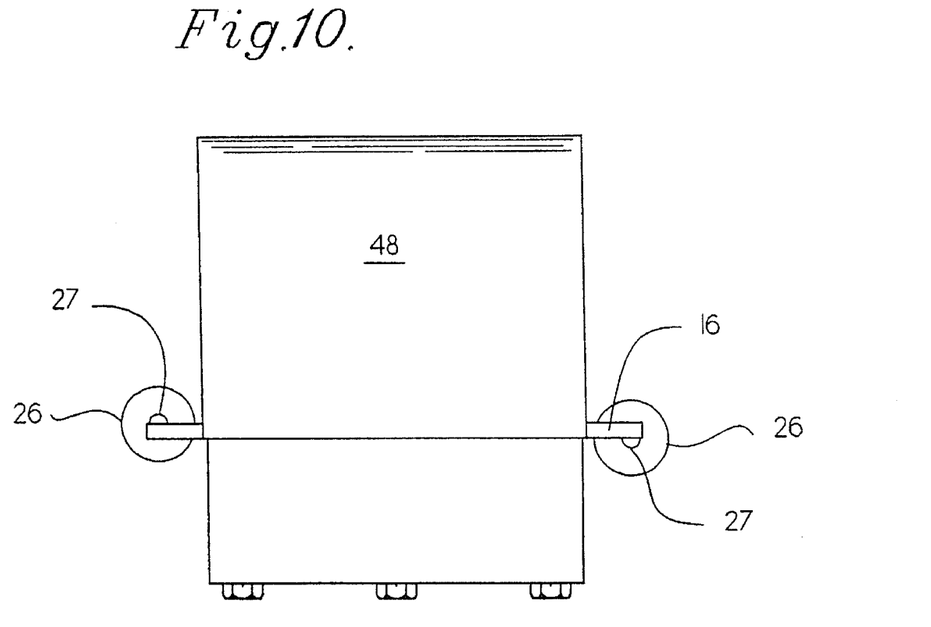
FIG. 10 is a side view of the carriage housing.

As shown in FIGS. 4, 9 and 10, a housing 48 is placed over a top part of the bed 16 to enclose the drive motors 22. A tool 50, for example, a welding or cutting torch, is attached to the housing 48 by an adjustable holder 52. The holder 52 allows for adjustment of the tool 50 in x, y and z directions with respect to the carriage 10.

Operation of the carriage 10 is as follows: The carriage 10 is placed on the workpiece flange 58 such that the drive rollers 20 abut a first side 62 of the workpiece flange 58. The adjusting screw 34 is then turned to place the idler rollers 42 in contact with a second side 66 of the workpiece flange 58. Preferably, the spring washers 44 are partially compressed so that the idler rollers 42 can move toward and away from the adjacent skirt flange 18 to accommodate variations in the thickness of the workpiece flange 58. Thus, the carriage 10 is held to the faces of the workpiece flange 58 and rides over an upper edge 70 of the workpiece flange 58.

The drive motors 22 impart rotation to the drive rollers 20 which pull the carriage 10 along the workpiece flange 58, as shown in FIG. 5. The idler rollers 42 freely rotate against the second side 66 as the carriage 10 moves. The transverse rollers 26 are in contact with and rotate over the upper edge 70 of the workpiece flange 58. As previously described, the forwardmost transverse roller 26, with respect to a direction of movement of the carriage 10, is attached to a top of the bed 16 and the rear transverse roller is attached to a bottom of the bed 16. This causes the carriage 10 to tilt in a forward direction. Hence, the axis of rotation of the drive rollers 20 is at an angle with a line perpendicular to the direction of travel of the carriage 10, thus biasing the carriage 10 toward the workpiece 54 as it moves along the workpiece flange 58.

Since the idler rollers 42 are spring biased toward the workpiece flange 58 and allowed to move against this bias, as previously described, the carriage 10 can be used on a workpiece 54 having a curved workpiece flange 58 as shown in FIG. 6.

Figure 14:
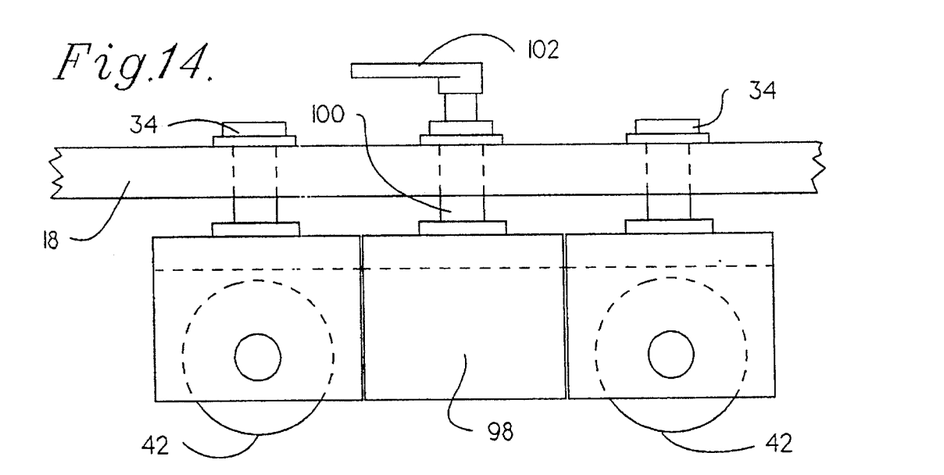
FIG. 14 is a top view of an alternative embodiment for biasing the path of the idler rollers toward the workpiece.
Figure 15A:
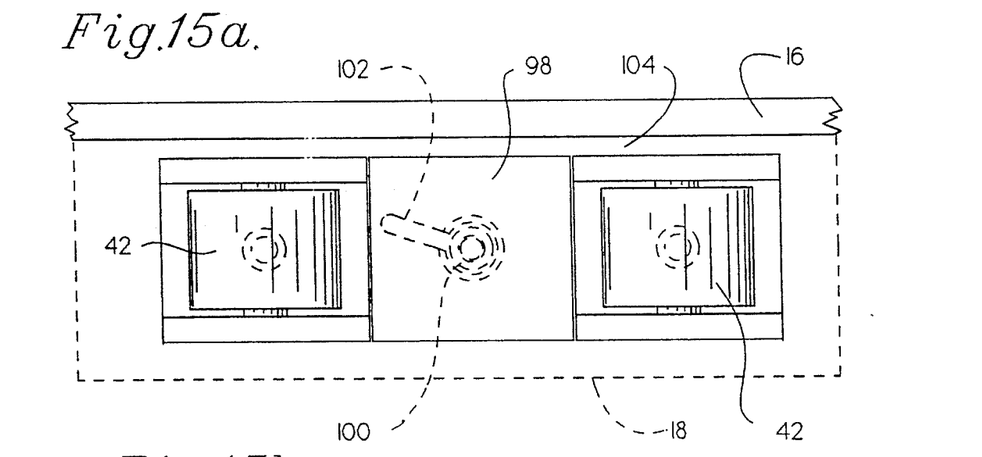
FIGS. 15a and 15b are side views of the alternative embodiment shown in FIG. 14.
Figure 15B:
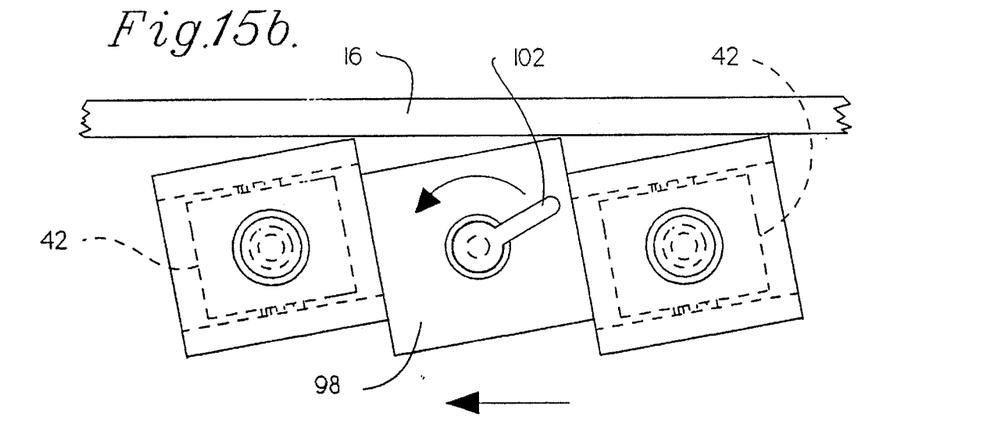

In an alternative embodiment in which the axes of rotation of the forwardmost and rear transverse rollers 26 lie in the same plane as the bed 16, the carriage 10 can be biased toward the workpiece flange 58 by use of pivotable idler rollers 42, as shown in FIGS. 14 and 15. As shown in FIG. 14, each idler roller 42 is contained in an independent roller block 38. Each roller block is journally connected to an end of an adjustment screw 34. A tilt block 98 is positioned between the two roller blocks 38. The tilt block 98 is fixed to one end of a positioning screw 100. A lever arm 102 is attached to the other end of the positioning screw 100. As shown in FIG. 15a, a gap 104 exists between the bottom of the bed 16 and the tops of the roller blocks 38 and tilt block 98 allowing limited rotation of the tilt block 98 and roller blocks 38 as shown in FIG. 15b.

To cause biasing of the carriage 10 toward the workpiece 54, the lever arm 102 is rotated. This causes rotation of the tilt block 98 which causes corners of the tilt block 98 to engage and rotate the adjacent roller blocks 38. In this manner, the path of the idler rollers 42 can be directed toward the workpiece 54 thereby biasing the carriage 10 to the workpiece 54.

Figure 7:
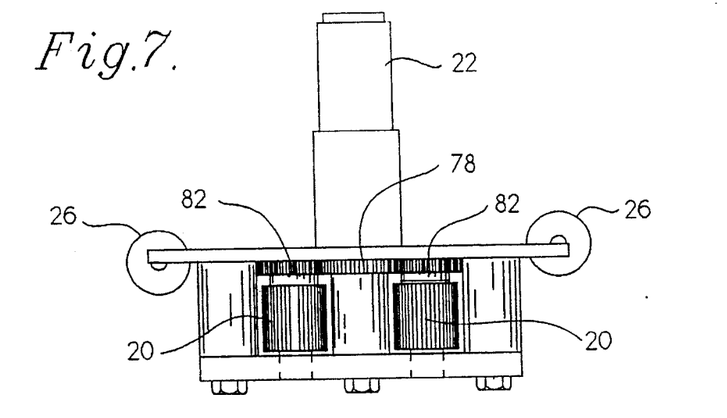
FIG. 7 is a side view of a second embodiment of the invention having a single drive motor driving a pinion gear which drives a pair of driven gears connected to a pair of drive rollers.
Figure 8:
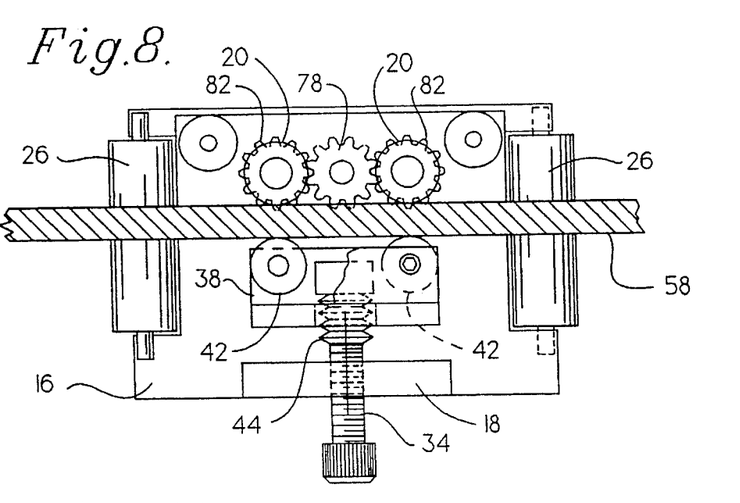
FIG. 8 is a bottom view of the second embodiment of the invention showing the position of the pinion and driven gears.

In a second embodiment of the carriage 10, as shown in FIGS. 7 and 8, the bed 16 has a single drive motor 22 which drives an associated pinion gear 78 which in turn rotates a pair of driven gears 82 connected to a pair of drive rollers 20.

Figure 12:
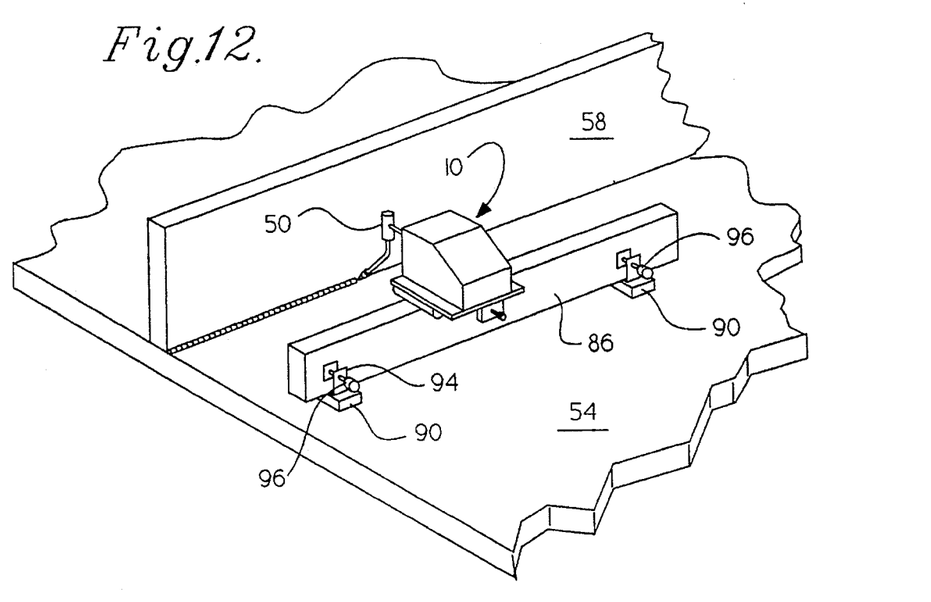
FIG. 12 is an elevated view of a straight workpiece flange and associated straight guide track for use with the present invention.
Figure 13:
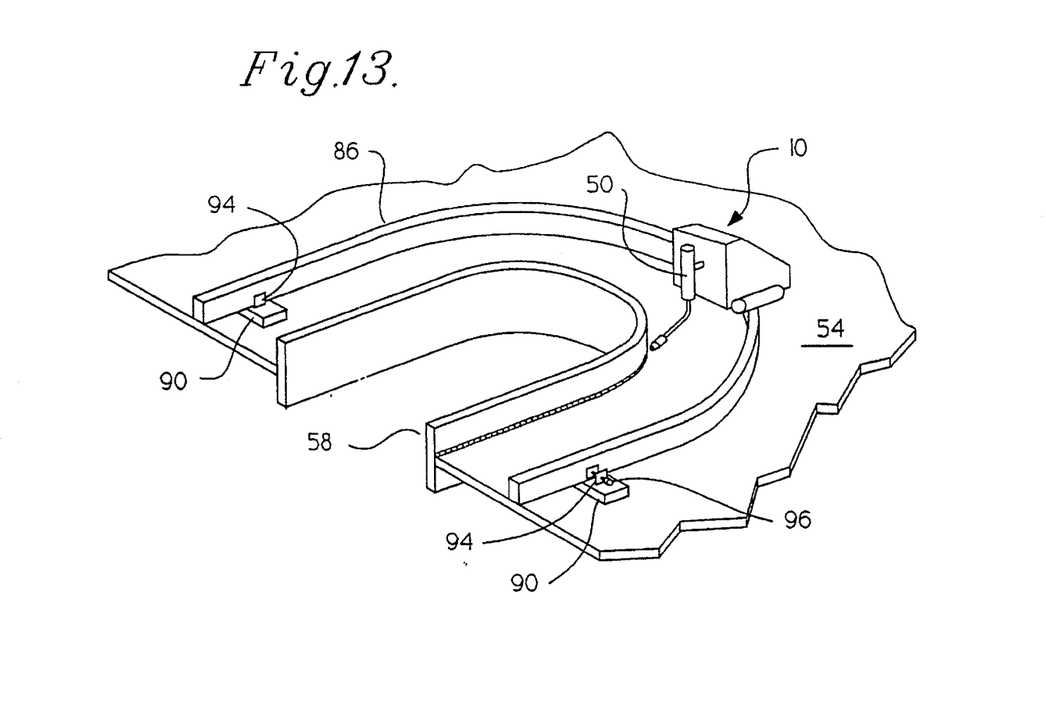
FIG. 13 is an elevated view of a curved workpiece flange and associated curved guide track for use with the present invention.

The operation of the carriage 10 has thus far been described in conjunction with its attachment to the workpiece flange 58. However, if the workpiece flange 58 is too short or if its surface is too irregular to allow smooth travel of the carriage 10 over the workpiece flange 58, a guide rail 86, as shown in FIGS. 12 and 13, can be positioned near the workpiece flange 58. The carriage 10 can then travel along the guide rail 86 with the tool 50 adjusted to act on the workpiece flange 58.

The guide rail 86 has a number of magnetized feet 90. Each of the feet 90 is attached to a bottom of the guide rail 86 by a U-shaped clamping device 94 connected to a top surface of each of the feet 90. The guide track 86 is secured to the U-shaped devices 94, for example, by a clamping screw 96. The magnetized feet 90 therefore hold the guide rail 86 in a stable condition on a surface of the workpiece 54.

For a straight workpiece flange 58, as shown in FIG. 12, the guide rail 86 can be fabricated of a rigid material, for example, aluminum. However, for curved workpiece flanges 58, as shown in FIG. 13, the guide rail 86 is preferably made of a deformable material, for example, polyurethane, which can be made to conform to the curvature of the workpiece flange 58.

Having described the presently preferred embodiments of the invention, it is to be understood that it may otherwise be embodied within the scope of the appended claims.

What is claimed is:

1. A carriage for carrying and guiding a tool at a controlled speed along a specified path on a workpiece having a flange extending therefrom, comprising:

a bed, moveable along said workpiece flange;

at least one drive roller mounted on said bed, said drive roller adapted to abut a first side of said flange;

means for rotating said drive roller;

a pair of idler rollers rotatably mounted to said bed, said idler rollers adapted to abut a second side of said flange;

means for adjusting the distance between said idler rollers and said drive roller;

means for permitting variation in the distance between said drive roller and said idler rollers;

means for adjusting the position of said tool relative to said bed;

a pair of transverse rollers mounted to said bed and positioned to ride over an upper edge of said flange; and means for biasing said carriage toward said workpiece flange.

2. The carriage as claimed in claim 1 wherein said means for rotating includes a drive motor attached to said drive roller.

3. The carriage as claimed in claim 1 further including a pair of spaced-apart drive rollers disposed on said bed, each drive roller having a drive motor attached thereto.

4. The carriage as claimed in claim 1 wherein said means for rotating includes a single drive motor and a drive train comprising a pinion gear simultaneously engaging and driving driven gears connected to a pair of drive rollers.

5. The carriage as claimed in claim 1 wherein said means for biasing includes a pair of transverse rollers positioned on said bed such that a forward most part of said bed is closer to said upper edge of said flange than is a rearmost part of said bed.

6. The carriage as claimed in claim 1 wherein said means for biasing includes a pair of pivotable idler rollers which can be manually pivoted to direct a path of said idler rollers toward said workpiece.

7. A carriage for carrying and guiding a tool at a controlled speed along a specified path on a guide track, comprising:

a bed, moveable along said guide track;

at least one drive roller mounted on said bed, said drive roller adapted to abut a first side of said guide track;

means for rotating said drive roller;

a pair of idler rollers rotatably mounted to said bed, said idler rollers adapted to abut a second side of said guide track;

means for adjusting the distance between said idler rollers and said drive roller;

means for permitting variation in the distance between said drive roller and said idler rollers;

means for adjusting the position of said tool relative to said bed;

a pair of transverse rollers mounted to said bed and positioned to ride over an upper edge of said guide track; and means for biasing said carriage toward said guide track.

8. The carriage as claimed in claim 1 wherein said means for adjusting the distance between said idler rollers and said drive roller includes an adjusting screw which passes through a threaded base and a roller block, containing said idler rollers, carried at an end of said adjusting screw.

9. The carriage as claimed in claim 1 wherein said means for permitting variation in the distance between said drive roller and said idler rollers includes a series of spring washers contained between a stage and an annular face on an adjusting screw such that said spring washers bias a roller block containing said idler rollers in a direction toward said drive roller.

10. The carriage as claimed in claim 1 wherein said means for adjusting the position of said tool relative to said bed includes an adjustable holder attached to a housing.

11. A carriage for carrying and guiding a tool at a controlled speed along a specified path on a workpiece having a flange extending therefrom, comprising:

a bed, moveable along said workpiece flange;

at least one drive roller mounted on said bed, said drive roller adapted to abut a first side of said flange;

means for rotating said drive roller;

a pair of idler rollers rotatably mounted to said bed, said idler rollers adapted to abut a second side of said flange;

means for adjusting the distance between said idler rollers and said drive roller;

means for permitting variation in the distance between said drive roller and said idler rollers;

means for adjusting the position of said tool relative to said bed;

a pair of transverse rollers mounted to said bed and positioned to ride over an upper edge of said flange; and means for biasing said carriage toward said workpiece flange comprising rollers pressing against sides of said flange which rollers are oriented to draw said carriage onto said flange.

12. A carriage for carrying and guiding a tool at a controlled speed along a specified path on a workpiece having a flange extending therefrom, comprising:

a bed, movable along said workpiece flange;

at least one drive roller mounted on said bed, said drive roller adapted to abut a first side of said flange;

means for rotating said drive roller;

a pair of idler rollers rotatably mounted to said bed, said idler rollers adapted to abut a second side of said flange;

means for adjusting a distance between said idler rollers and said drive roller;

means for permitting variation in the distance between said drive roller and said idler rollers;

means for adjusting the position of said tool relative to said bed;

a pair of transverse rollers mounted to said bed and positioned to ride over an upper edge of said flange; and means for biasing said carriage toward said workpiece flange, wherein said biasing means includes said pair of transverse rollers positioned such that a forwardmost part of said bed is closer to said upper edge of said flange than is a rearmost part of said bed.

13. The carriage as claimed in claim 1 wherein said biasing means biases said carriage to said flange no matter what the spatial orientation of the flange.

14. The carriage as claimed in claim 12 wherein said means for rotating said at least one drive roller includes a drive motor having a rotatable pinion gear which engages a driven gear connected to said at least one drive roller.

* * * * *